(12) United States Patent
Crouch

(10) Patent No.: US 8,767,192 B2
(45) Date of Patent: Jul. 1, 2014

(54) ACTIVE RETRODIRECTIVE ANTENNA ARRAY WITH A VIRTUAL BEACON

(75) Inventor: David D. Crouch, Corona, CA (US)

(73) Assignee: Raytheon Company, Waltham, MA (US)

(*) Notice: Subject to any disclaimer, the term of this patent is extended or adjusted under 35 U.S.C. 154(b) by 577 days.

(21) Appl. No.: 13/171,006

(22) Filed: Jun. 28, 2011

(65) Prior Publication Data
US 2013/0002472 A1 Jan. 3, 2013

(51) Int. Cl.
*G01S 17/66* (2006.01)
*G01S 17/32* (2006.01)
*G01S 7/486* (2006.01)

(52) U.S. Cl.
CPC ............. *G01S 17/66* (2013.01); *G01S 17/32* (2013.01); *G01S 7/4863* (2013.01)
USPC ............................................ 356/5.1; 356/3.1

(58) Field of Classification Search
CPC ........ G01S 7/4863; G01S 17/32; G01S 17/66
USPC .................................................. 356/3.1, 5.1
See application file for complete search history.

(56) References Cited

U.S. PATENT DOCUMENTS

| | | | | | |
|---|---|---|---|---|---|
| 3,500,411 | A | * | 3/1970 | Kiesling | 342/353 |
| 3,757,335 | A | * | 9/1973 | Gruenberg | 342/367 |
| 3,764,213 | A | * | 10/1973 | O'Meara | 356/5.1 |
| 4,129,775 | A | * | 12/1978 | O'Meara | 250/203.1 |
| 4,148,031 | A | * | 4/1979 | Fletcher et al. | 342/370 |
| 4,215,936 | A | * | 8/1980 | Winocur | 250/201.9 |
| 4,233,606 | A | | 11/1980 | Chernoff | |
| 4,686,534 | A | * | 8/1987 | Eddy | 342/165 |
| 4,798,462 | A | * | 1/1989 | Byren | 356/139.08 |
| 4,812,639 | A | * | 3/1989 | Byren et al. | 250/201.1 |
| 4,849,764 | A | * | 7/1989 | van Heyningen | 342/381 |
| 4,985,707 | A | | 1/1991 | Schmidt et al. | |
| 5,150,170 | A | * | 9/1992 | Morris | 356/28.5 |
| 5,378,888 | A | * | 1/1995 | Stappaerts | 250/201.9 |
| 5,673,699 | A | * | 10/1997 | Trahey et al. | 600/447 |
| H1742 | H | * | 8/1998 | Richmond | 356/4.01 |
| 6,115,123 | A | * | 9/2000 | Stappaerts et al. | 356/457 |
| 6,630,905 | B1 | | 10/2003 | Newberg et al. | |
| 6,795,174 | B1 | * | 9/2004 | Miller | 356/141.1 |

(Continued)

OTHER PUBLICATIONS

Ralph C. Chernoff, Large Active Retrodirective Arrays for Space Applications, IEEE Transactions on Antennas and Propagation, vol. AP-21, No. 4, Jul. 1979.

(Continued)

*Primary Examiner* — Luke Ratcliffe
*Assistant Examiner* — Ari M Diacou
(74) *Attorney, Agent, or Firm* — Eric A. Gifford

(57) ABSTRACT

An active retrodirective antenna array is provisioned with a virtual beacon for use with uncooperative targets. An RF pilot signal is imposed onto an optical carrier beam and directed at a target. The scattered optical carrier beam is optically detected by a plurality of the retrodirective array nodes to extract the RF pilot signal. Each recovered RF pilot-signal is phase-conjugated with a phase reference signal, amplified and retransmitted towards the target where the RF beams add-in phase at the virtual beacon. The array may be used to complete an RF communication link with the target, to transfer microwave power from orbiting solar power stations to a target or as a directed energy weapon to prosecute the target.

20 Claims, 10 Drawing Sheets

(56) References Cited

U.S. PATENT DOCUMENTS

| | | | |
|---|---|---|---|
| 7,304,296 B2 | 12/2007 | Mills et al. | |
| 7,378,626 B2 | 5/2008 | Fetterly | |
| 7,504,982 B2 | 3/2009 | Berg et al. | |
| 7,535,409 B1* | 5/2009 | Choe et al. | 342/159 |
| 7,944,396 B2* | 5/2011 | Brown et al. | 342/370 |
| 2010/0259447 A1* | 10/2010 | Crouch | 342/374 |
| 2011/0084879 A1* | 4/2011 | Brown et al. | 342/370 |
| 2011/0102261 A1 | 5/2011 | Egri | |
| 2011/0285593 A1* | 11/2011 | Cavirani et al. | 342/457 |

OTHER PUBLICATIONS

Grant Shiroma et al., A Full-Duplex Dual-Frequency Self-Steering Array Using Phase Detection and Phase Shifting, IEEE Transactions on Microwave Theory and Techniques, vol. 54, No. 1, Jan. 2006.

Vincent Fusco et al. ,Analysis and Characterization of PLL-Based Retrodirective Array, IEEE Transactions on Microwave Theory and Techniques, vol. 53, No. 2, Feb. 2005.

Thorlabs, 20 GHz Low $V\pi$ Analog Intensity Modulator, www.thorlabs.com.

* cited by examiner

ACTIVE RETRODIRECTIVE ANTENNA ARRAY WITH A VIRTUAL BEACON

BACKGROUND OF THE INVENTION

1. Field of the Invention

This invention relates to active retrodirective antenna arrays and more particularly to an active retrodirective antenna array (ARAA) that uses an optical carrier beam to reflect an RF pilot signal off a target to create a virtual beacon to individual nodes in the array.

2. Description of the Related Art

For many applications, it is necessary or desirable to be able to automatically track a received signal. In a radar or communication application, for example, it might be useful to be able to track a source of a received signal. A satellite or another RF signal, for example, might be tracked and a return signal automatically transmitted back to the satellite or RF signal source in response thereto. An automatic tracking system might allow for more effective and efficient direction of a return beam to complete an RF signal source or communication link.

Conventionally, beam tracking has involved physically pointing an antenna in the direction of the received beam or processing the received signal with a tracking algorithm to steer a phased array antenna in the direction of the received signal. At any given time, the phase shifts applied to each array element in a phased array determine the direction of the main beam for both reception and transmission. Considerable analog and digital processing is required to track a target and radiate a beam in the direction of said target. Thus, while phased array antennas have been used for some time, automatic beam steering in response to an RF signal with a phased array antenna has been somewhat problematic to date.

An active retrodirective antenna array (ARAA) is a phased antenna array that automatically steers its transmitted beam towards the apparent source of an incoming pilot signal. The modifier "active" means that the radiated power is generated by sources associated with the antenna, rather than by reflection of an incident signal as in a passive retrodirective antenna (e.g., corner reflector). Such arrays, which are also known as "self-focusing" arrays, have been suggested for some time. In such arrays, the transmitted wavefront duplicates the incoming pilot signal wavefront whatever its shape. The self-focusing property is important because it means that the transmitted power is focused back on the pilot source whatever the state of the intervening propagation medium, provided that the state persists for the round-trip propagation time. The retrodirective properties of proposed ARAA's is achieved by "conjugating" a pilot signal incident at each array node. Though not yet in widespread use, ARAA's are expected to become an important part of phased array technology. They have, for example, been proposed for microwave power-transmission from orbiting solar power stations, communication satellite transmitting arrays, and aircraft transponders.

When a retrodirective array receives an RF pilot signal from an unspecified direction, each array node receiving the RF pilot signal automatically generates and transmits a phase-conjugated RF pilot signal in the reverse direction without any previous knowledge as to the location of the signal source and without the need for sophisticated digital signal processing. The nodes may be randomly dispersed over a wide area, and knowledge of their positions is not required. The source of the RF pilot signal is a microwave beacon attached to a cooperative target. The beacon broadcasts the RF pilot signal which is received by some or all of the nodes of the array. The phase of the received signal is conjugated with a phase reference derived from the received pilot signal itself, amplified, and retransmitted at a different frequency to preserve isolation. The process of conjugating the phase of the received pilot signal causes the phase accumulated during propagation from the beacon to each node to be cancelled during the return trip. As a result, the signals transmitted by the individual nodes converge at the beacon with nearly identical phases, causing them to add coherently. U.S. Pat. Nos. 4,148,031 and 6,630,905, which are hereby incorporated by reference, describe different techniques for processing the received pilot signal to extract a phase reference for performing the phase-conjugation.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides for an active retrodirective antenna array for use with uncooperative targets. The active retrodirective antenna array automatically tracks the uncooperative target, friendly or unfriendly, and returns an amplified RF signal to the target. The array may, for example, be used to complete an RF communication link, to transfer microwave power from orbiting solar power stations or as a directed energy weapon to prosecute the target.

In an embodiment, an optical carrier beam with a first RF pilot signal imposed thereon is directed into a spot on the target. The scattered optical carrier beam forms a virtual beacon. The scattered optical carrier beam is detected by a plurality of the retrodirective array nodes to extract a second RF pilot signal. The second RF pilot-signals are phase-conjugated with a phase reference signal, amplified and retransmitted towards the target where the RF beams add-in phase at the virtual beacon on the target.

In an embodiment, the RF pilot signal has a frequency of approximately 0.5 to 500 GHz and the optical carrier beam lies in UV, IR or visible spectrum spanning approximately 0.4 to 300 micron wavelength.

In an embodiment, scattering the optical carrier beam off of the target may create multiple virtual beacons at different points on the target. In another embodiment, the optical carrier beam is focused into a spot whose diameter is less than one-half wavelength of the RF pilot signal to create a single point source for the virtual beacon. The optical carrier beam may be adaptively focused based on range-to-target to maintain the spot size as the target is tracked.

In an embodiment, the phase reference signal may be derived either from a reference signal used to impose the RF pilot signal on the optical carrier beam or from the received RF pilot signal. The reference signal may be generated by a reference oscillator or extracted from a source of the optical carrier beam. Phase-conjugation may be performed locally at each node or remotely at a common phase-conjugation circuit.

In an embodiment, the phase-conjugated RF pilot signal is retransmitted at the same frequency as the received RF pilot signal. Because the pilot signal is carried on the optical beam isolating the input (received pilot signal) and output (conjugated pilot signal) is not an issue.

In an embodiment, a point and track mechanism generates a tracking signal to the target. The point and track mechanism may comprise a manual mechanism, a radar system or an optical detector. An illuminator is responsive to the tracking signal to direct the optical beam onto the target. The point and track mechanism may slew on a gimbal to point a boresight axis at the target. The illuminator may be mounted on the gimbal to follow the target as the mechanism slews.

In different embodiments, each node may be fixed to retransmit the pilot signal in a predetermined direction, all nodes may be fixed to a single gimbal that slews to nominally point at the target or each node may be individually gimbaled to point its main beam at the target. The single gimbal or individual node gimbals may be slaved to a point and track system used to point the illuminator. The point and track mechanism, illuminator and all of the nodes may be mounted on the same gimbal.

In different embodiments, each node may retransmit RF energy continuously, only retransmitting the phase-conjugated pilot signal when the optical receiver is illuminated by the virtual beacon, may retransmit RF energy only when the optical receiver has detected a virtual beacon or may retransmit RF energy only when the optical receiver has detected a virtual beacon and the main beam of the retransmitted RF energy overlaps the intended target.

In an embodiment, the active retrodirective antenna array is configured as a directed energy weapon to deliver a microwave power density onto the target that exceeds a target dependent threshold to incapacitate, damage or destroy the target. The directed energy weapon may be terrestrial (fixed or moving vehicle), air, sea or space based.

These and other features and advantages of the invention will be apparent to those skilled in the art from the following detailed description of preferred embodiments, taken together with the accompanying drawings, in which:

DETAILED DESCRIPTION OF THE INVENTION

The present invention provides for an active retrodirective antenna array (ARAA) for use with uncooperative targets. The ARAA automatically tracks the uncooperative target and returns an RF signal to the target. The array may be used to complete an RF communication link, to transfer microwave power from orbiting solar power stations or as a directed energy weapon to prosecute the target.

An "uncooperative" target is defined as a target that does not itself generate the RF pilot signal through a physical beacon attached to the target. The "uncooperative" target may be friendly such as for power transfer or communications or unfriendly such as for a directed energy weapon. In theory, friendly targets could be fixed with a physical beacon and use conventional ARAA approaches. The "virtual beacon" technique provides flexibility to engage friendly targets without the need for a physical beacon being attached. Unfriendly targets are not going to willingly allow a physical beacon to be attached. The "virtual beacon" technique allows those unfriendly targets to be tracked and possibly prosecuted to incapacitate, damage or destroy the target. As directed to unfriendly targets, this technique allows for the benefits of the ARAA over single-source directed-energy weapons. The ARAA can focus greater power density onto the target. The ARAA is more robust than a single-source directed energy weapon; if a node or nodes are lost the performance degrades gracefully as opposed to single point failure. ARAA capcacity can be adapted by adding or subtracting nodes.

Figure 1:
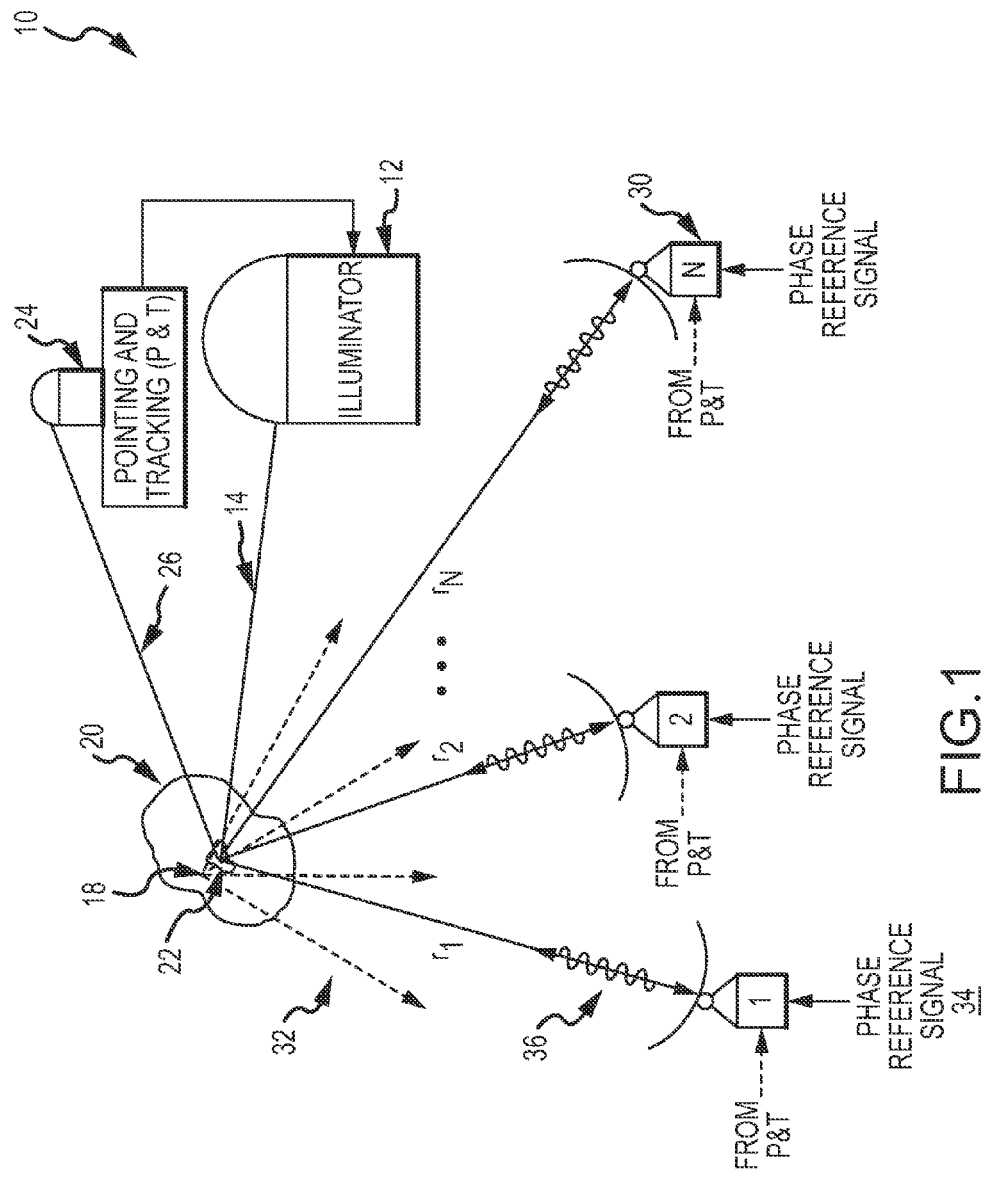
FIG. 1 is a diagram of an embodiment of an active retrodirective antenna array that creates a virtual beacon for an uncooperative target in accordance with an embodiment of the present invention.
Figure 2:
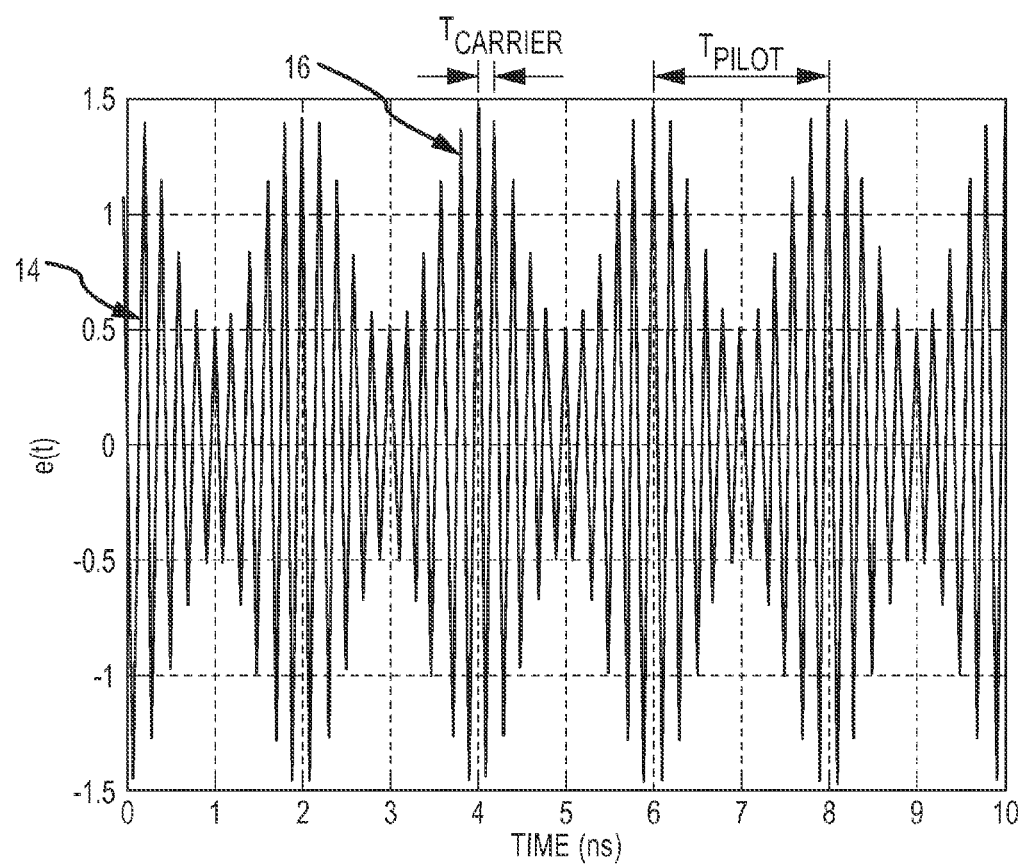
FIG. 2 is a diagram of an optical carrier beam with an RF pilot signal imposed thereon.

As shown in FIGS. 1 and 2, an embodiment of an ARAA 10 comprises an illuminator 12 that directs an optical carrier beam 14 bearing a first RF pilot signal 16 into a spot 18 on a target 20 to create the aforementioned virtual beacon 22. The optical carrier beam lies in the UV (<0.4 microns), Visible (0.4 to 0.75 microns) or the IR (0.75 to 300 microns) band. The first RF pilot signal has a frequency between approximately 0.5 and 500 GHz (0.6 M to 0.6 mm). By industry convention, optical signals are specified by their wavelength and RF signals by their frequency. Optical carrier beam 14 is suitably a collimated laser beam that is focused onto the target. The beam may be adaptively focused as the range-to-target changes to maintain a small spot size. Depending upon the nature of the target and the relative diameter of spot 18 to the RF wavelength, the illuminator may produce one or more virtual beacons 22. A smaller spot size (e.g. less than one-half wavelength of the RF pilot signal) should produce a single point source.

To achieve retrodirective array performance comparable to a fixed beacon, the virtual beacon 22 must be formed and stably maintained on the target. To form a stable virtual beacon, a pointing and tracking device 24 is provided for accurately pointing the illuminator at the target and for tracking target motion. Device 24 may be a manual system such as a handheld or tripod mounted device on which the illuminator 12 is mounted. An operator maintains the optical carrier beam 14 on the target using visual feedback. A manual system may be sufficient if the target is stationary or slowly moving and not too distant. Other applications may require an automated solution utilizing an automatic pointing and tracking system. Device 24 may comprise an RF based or optical (passive or active) based system to maintain the optical carrier beam on the target. Illuminator 12 may be mounted on the RF or optical tracking system. Alternately, the illuminator 12 may be mounted on its own gimbal system and responsive to a tracking signal generated by device 24 to slew on the gimbal and point the optical carrier beam at the target. In this particular embodiment, the point and track device 24 comprises a laser tracker that includes a gimbaled laser and semi-active laser (SAL) detector. The laser emits a laser beam 26 that is scattered by the target. The SAL detector detects the scattered laser energy and produces estimated azimuth (Az) and elevation (El) angles to the target. The laser tracker slews on the gimbal to point its boresight axis at the target. The illuminator 12 can be mounted on the laser tracker to direct the optical carrier beam along boresight, and thus maintain the virtual beacon on the target.

ARAA 10 comprises a plurality of nodes 30. The nodes may be randomly dispersed over a wide area, and knowledge of their positions is not required. Each node optically receives and detects scattered light 32 originating from the virtual beacon and extracts a second RF pilot signal. The second RF pilot signal may have the same frequency as the first RF pilot signal or may be a harmonic thereof. Because the first RF pilot signal is carried on the optical carrier beam isolating the input (received pilot signal) and output (conjugated pilot signal) is not an issue, hence the same frequency may be used. The node processes the second RF pilot signal and a phase reference signal 34 to produce a phase-conjugated RF pilot signal 36. Phase-conjugation may be processed locally at each node or at a common circuit. Phase reference signal 34 may be a derivative of a reference signal used by the illuminator to impose the RF pilot signal onto the optical carrier beam or may be a derivative of the second RF pilot signal extracted from the received optical carrier beam at a reference node. Each node amplifies and retransmits the phase-conjugated RF pilot signal 36 towards the target. Phase conjugation reverses the sign of the phase accumulated by each pilot signal in propagating from the virtual beacon to each array node. As long as any additional phase shifts introduced by the phase conjugation process are the same for all array nodes, the transmitted conjugated signals will arrive at the target with nearly the same phase and will thus add coherently.

If the nodes are idealized omnidirectional antennas, no pointing is required. Real antennas are not omnidirectional. All that is required, however, is that the beacon lie within the main beam of each antenna, preferably between the 3 dB points. If the antenna is small and has a wide main beam, pointing and tracking requirements are minimal. For high-gain antennas having very narrow main beams, the pointing and tracking requirements will be more challenging. However, even with high-gain antennas it is not necessary to point the peak of the main beam precisely at the beacon. The pointing and tracking requirements will be considerably less than those imposed on the illuminator. The retrodirective property of the array takes care of the fine pointing necessary to focus the collective beam radiated by the array onto the beacon.

At a system level the pointing requirement may be addressed in different ways. In an embodiment, each node can independently point and track the target. The nodes may independently generate their own tracking signals or may use a common tracking signal ("from P&T") such as provided by the point and track device for the illuminator. Each node may be mounted on a gimbal that allows it to slew and track the target. In another embodiment, the nodes may be arrayed on a single gimbal mount that responds to a tracking signal to point a boresight axis at the target. Each of the nodes are nominally aligned to boresight and thus point at the target as the gimbal slews. As previously mentioned, the illuminator could be co-located with the array of nodes on the same gimbal. In another embodiment, each node is fixed to direct its main beam along a fixed path. The main beams that overlap at the target contribute to the total power directed onto the target.

While FIG. 1 shows the illuminator as a separate functional unit, it may be integrated into one of the nodes that comprise the array. For purposes of redundancy, it may be desirable to equip each node with an illuminator unit with requisite pointing and tracking device, where only one illuminator is active at any time.

Figure 3:
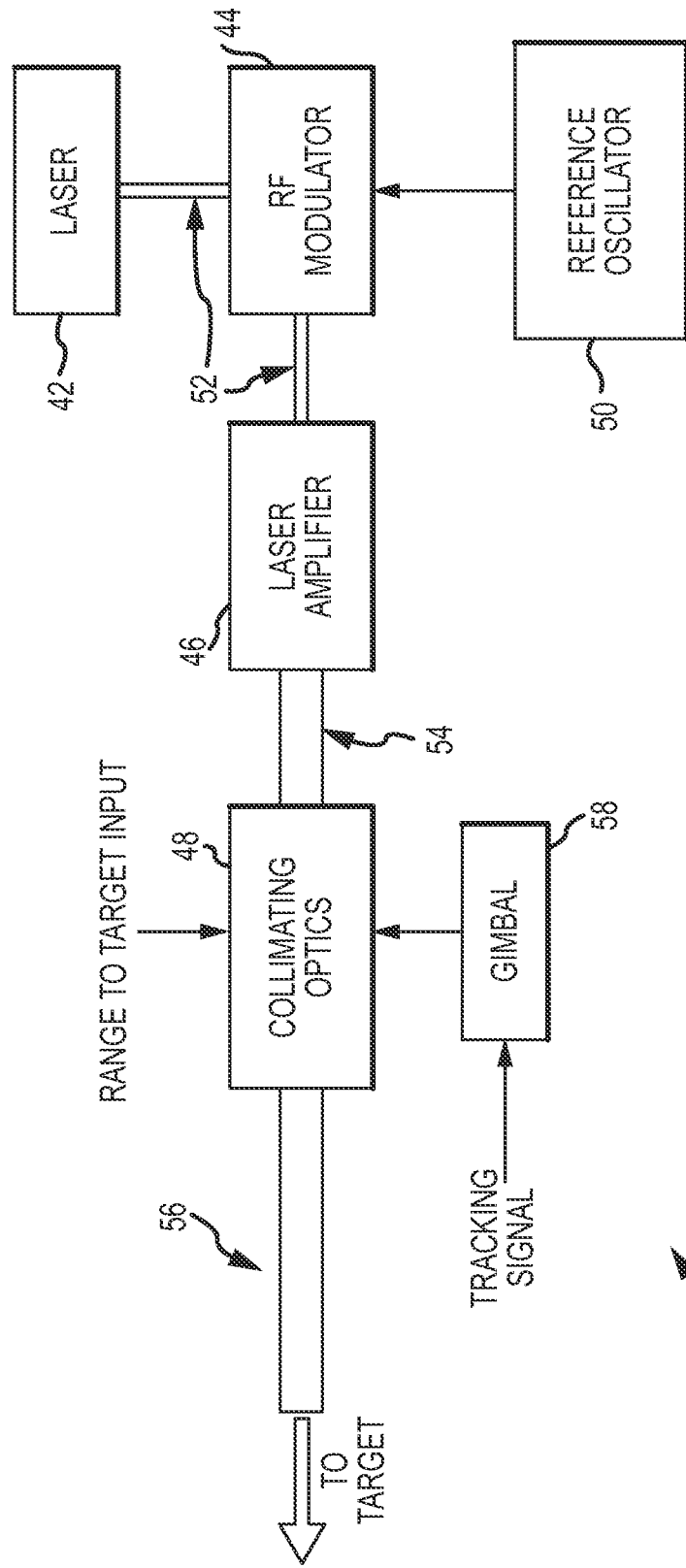
FIG. 3 is a block diagram of an embodiment of an illuminator that imposes an RF pilot signal onto an optical carrier beam that is directed at the target to create the virtual beacon.

An embodiment of an illuminator 40 is shown in FIG. 3. The illuminator comprises a laser 42, an RF modulator 44, a laser amplifier 46, and collimating optics (e.g. lenses and mirrors) 48. The RF modulator accepts two inputs. One input is a laser beam generated by laser 42. The other input is an RF reference signal from a reference oscillator 50. RF modulator 44 modulates the laser beam with the reference signal to impose the first RF pilot signal onto the laser beam. If co-located with the nodes, reference oscillator 50 may provide a convenient source for the phase reference signal for phase-conjugation.

An RF modulator may comprise a Mach-Zender interferometer that modulates the amplitude of the laser beam. The incoming laser beam is split into two beams. The phase of one of the beams is shifted as it travels through a nonlinear material whose index of refraction is controlled by the RF reference signal voltage. The two beams are recombined. If the phase shift is equivalent to an integer number of wavelengths, the two beams combine constructively (in phase) the output intensity will be at its maximum. If the phase shift is equivalent to one-half wavelength, the two beams will combine destructively (out of phase) and the output intensity will be at its minimum. The output is the RF reference signal imposed onto the laser beam.

In the illustrative embodiment, the laser, optical modulator, and laser amplifier are coupled together by single-mode fiber optic cable 52. A multimode fiber optic cable 54 is used to couple the high-power output of the laser amplifier to the collimating optics. The output of the collimator is a collimated laser beam 56 with the first RF pilot signal imposed thereon that illuminates a small area on the target. To minimize the size of the illuminated spot on the target, the collimating optics may include variable optics capable of focusing the laser at varying ranges to target. To point the collimated laser beam 56 at the target and track target motion, collimating optics 48 are mounted on a gimbal 58. The gimbal responds to a tracking signal to slew and point the laser beam at the target. Other embodiments may omit the laser amplifier, which may be needed if the modulator is incapable of handling the desired laser power levels. Furthermore, other embodiments may include elements omitted from the illustrative embodiment, such as filters, beamsplitters, and gratings without departing from the scope of the present invention.

An alternate embodiment of an illuminator comprises a mode-locked laser (MLL). A MLL may be configured to generate a periodic train of short pulses at a pulse repetition rate at RF frequencies thereby directly imposing the first RF pilot signal onto an optical carrier beam. No reference signal is required to modulate the optical carrier beam. However, if one wished to generate a reference signal to provide the phase reference signal for phase-conjugation such a signal could be extracted from the MLL. For example, the laser beam could be passed through a beam splitter to couple a small fraction of the power from the beam. The coupled beam could be detected to generate an RF reference signal in the same manner as is performed at each node of the array to detect the scattered optical carrier beam and extract a second RF pilot signal.

Figure 4:
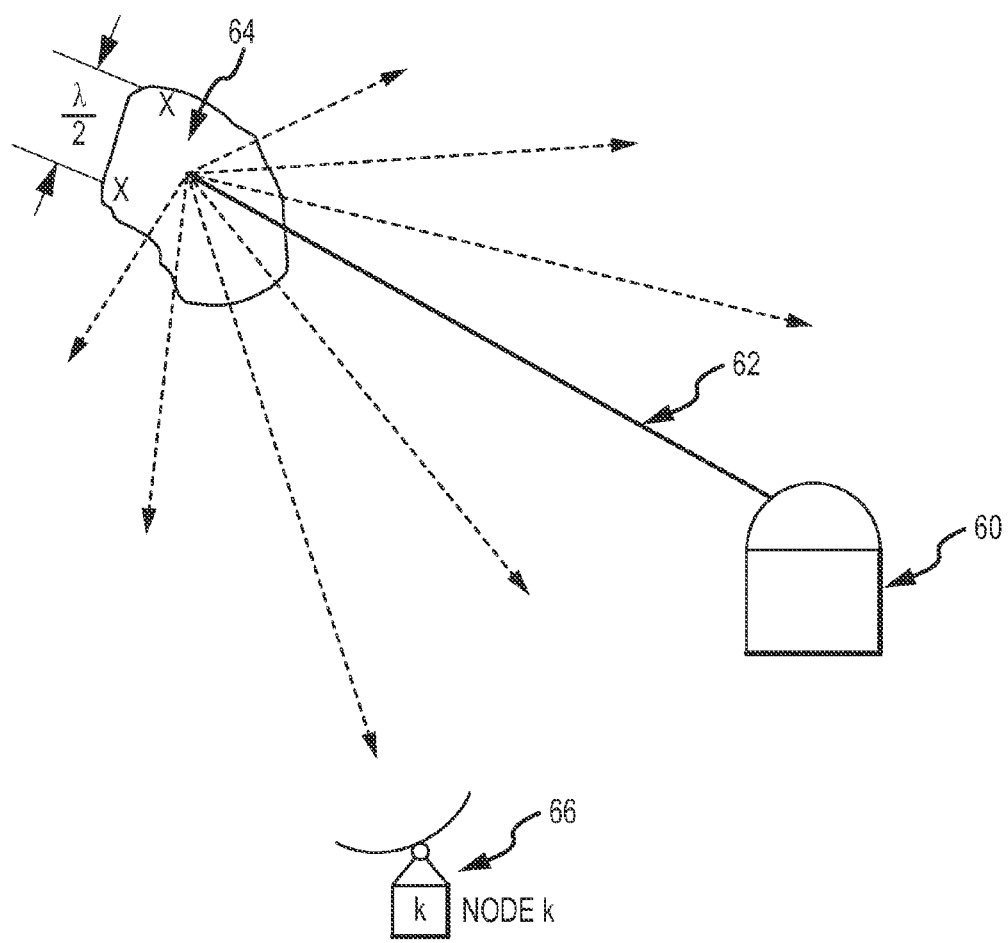
FIG. 4 is a diagram of an embodiment in which the spot size is less than one-half wavelength of the RF pilot signal to create a point source.

As shown in FIG. 4, an illuminator 60 directs an optical carrier beam 62 with a first RF pilot signal imposed thereon into a spot 64 on the target. The target scatters the optical carrier beam to illuminate a plurality of nodes 66 and create a virtual beacon. Depending on the spot size (e.g. diameter), the scattered light may create one or more virtual beacons at different scatterers on the target. In some applications it may be desirable that a single virtual beacon be created as a point source. To ensure a point source, the optical carrier beam 62 is focused on the target so that the spot size is less than one-half wavelength of the first RF pilot signal.

The RF pilot signal may be imposed on the optical carrier beam using a variety of techniques including but not limited to amplitude, phase or frequency modulation. The modulation need not be sinusoidal, only periodic with a non-zero component at the desired RF pilot signal frequency. Any periodic modulation envelope function m(t) having period T may be represented by a Fourier series of the form $$m(t) = a_0 + \sum_{n=1}^{\infty} a_n \cos n\omega_0 t + \sum_{n=1}^{\infty} b_n \sin n\omega_0 t, \tag{1}$$

where $\omega_0 = 2\pi/T$ is the fundamental modulation frequency. The resulting modulated optical carrier beam is then of the form $$f(t) = m(t)\cos\omega_L t \tag{2}$$

$$= a_0 \cos\omega_L t + \frac{1}{2}\sum_{n=1}^{\infty} a_n \left\{ \begin{array}{l} \cos[(\omega_L + n\omega_0)t] + \\ \cos[(\omega_L - n\omega_0)t] \end{array} \right\} +$$

$$\frac{1}{2}\sum_{n=1}^{\infty} b_n \{\sin[(\omega_L + n\omega_0)t] - \sin[(\omega_L - n\omega_0)t]\}.$$

The corresponding optical detector output at node k is $$P_k(t) \propto \overline{f_k^2(t)} = \tag{3}$$

$$K \sum_{n,m=0}^{\infty} \left\{ (a_n a_m + b_n b_m)\cos\left[(n-m)\omega_0\left(t - \frac{n_L r_k}{c}\right)\right] - 2a_n b_m \right.$$

$$\sin\left[(n-m)\omega_0\left(t - \frac{n_L r_k}{c}\right)\right] + (a_n a_m - b_n b_m)\cos\left[$$

$$\left.(n+m)\omega_0\left(t - \frac{n_L r_k}{c}\right)\right] + 2a_n b_m \sin\left[(n+m)\omega_0\left(t - \frac{n_L r_k}{c}\right)\right] \right\}.$$

Usually only a single frequency component is of interest. If that frequency is $M\omega_0$, where M is a positive integer, and if all terms are discarded from Eq. 3 except for those for which |n−m|=M and n+m=M, the signal that emerges is of the form $$i_k(t) = K\left\{ A\cos\left[M\omega_0\left(t - \frac{n_L r_k}{c}\right)\right] - B\sin\left[M\omega_0\left(t - \frac{n_L r_k}{c}\right)\right] \right\} \tag{4}$$

$$= K\left\{ \sqrt{A^2+B^2} \left\{ \begin{array}{l} \frac{A}{\sqrt{A^2+B^2}}\cos\left[M\omega_0\left(t - \frac{n_L r_k}{c}\right)\right] - \\ \frac{B}{\sqrt{A^2+B^2}}\sin\left[M\omega_0\left(t - \frac{n_L r_k}{c}\right)\right] \end{array} \right\} \right\}$$

$$= K\left\{ \sqrt{A^2+B^2} \cos\left[M\omega_0\left(t - \frac{n_L r_k}{c}\right) + \varphi_0\right] \right\},$$

where $$\cos\varphi_0 = \frac{A}{\sqrt{A^2+B^2}}, \quad \sin\varphi_0 = \frac{B}{\sqrt{A^2+B^2}}. \tag{5}$$

The signal described by Eq. 4 is a sinusoid of frequency $M\omega_0$ and phase $\phi_0$ and is suitable for use as the second RF pilot signal since neither $M\omega_0$ nor $\phi_0$ depend on the node index k.

The phase of the second RF pilot signal in Equation 4 is:

$$\varphi_k(t) = \omega_{RF}\left(t - \frac{n_L r_k}{c}\right) + \theta_0 + \alpha \tag{6}$$

Each node processes the second RF pilot signal and a phase reference signal to generate a phase-conjugated RF pilot signal. As previously mentioned, phase reference signal may be derived from an RF reference signal used to modulate the optical carrier beam or may be derived from the recovered RF pilot signal. There are many known techniques for distributed the phase reference signal to the nodes and for performing the phase-conjugation.

The phase of the conjugated signal is generally defined by $$\varphi_k^*(t) = \omega'_{RF}\left(t + \frac{n_L r_k}{c}\right) + \theta_0 + \alpha + \beta \tag{7}$$

where $\omega'_{RF} = 2\pi f'_{RF}$ is the angular frequency of the conjugated signal, and $\theta_0$ is an arbitrary phase, $\alpha$ is a cumulative phase change induced by transmission through the circuit to the output of the pre-conjugation circuit and $\beta$ is an arbitrary phase offset which must be the same for all array nodes. Each node amplifies and retransmits the phase-conjugated RF pilot signal. Retrodirectivity holds as long as dispersive effects are minimal.

Figure 5:
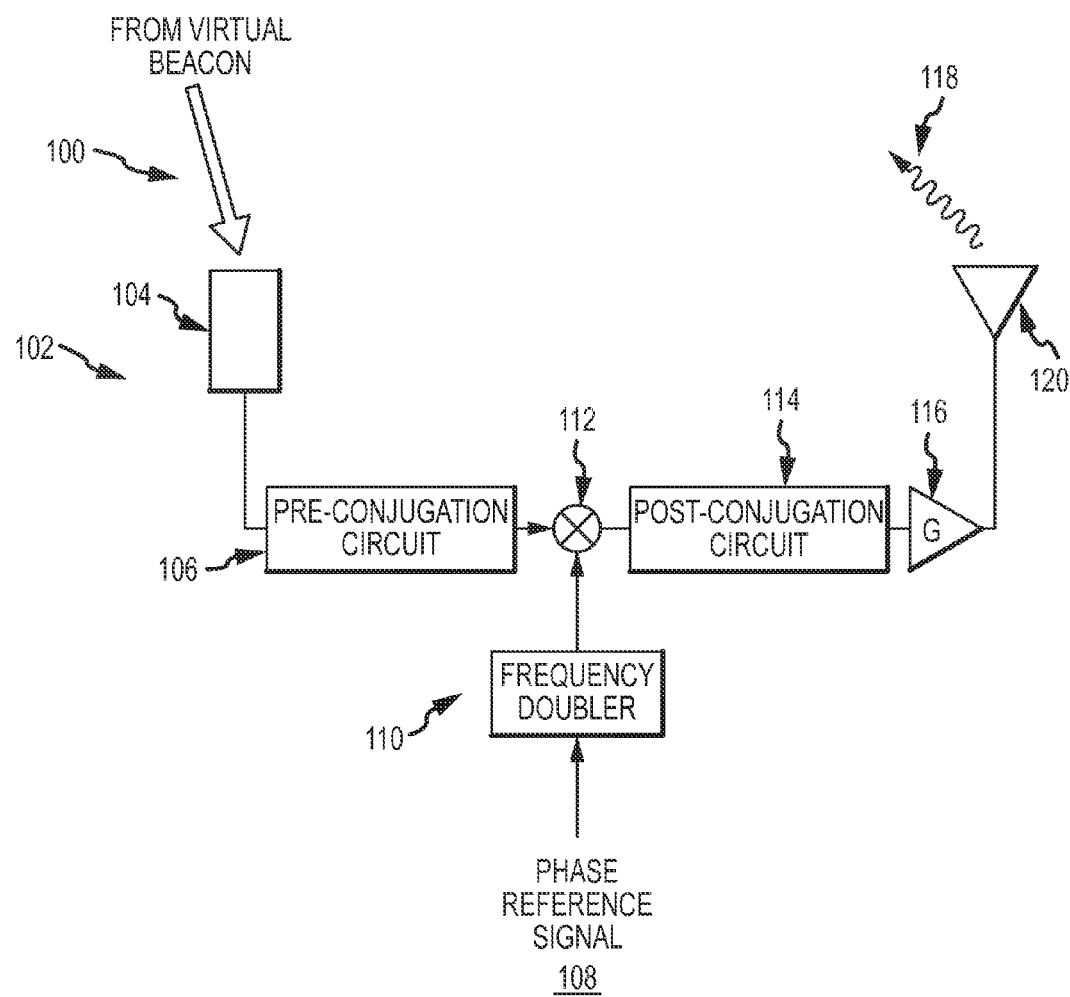
FIG. 5 is a diagram of an embodiment of a node of the array.

In an illustrative embodiment depicted in FIG. 5, an amplitude-modulated optical carrier beam 100 having time-dependent amplitude $$e(t) = [a + b \cos(\omega_{RF} t + \theta_0)] \cos\omega_L t \tag{8}$$

generates a virtual beacon on a target. In Eq. 8 $\omega_{RF} = 2\pi f_{RF}$ is the first RF pilot signal frequency, $\omega_L = 2\pi f_L$ is the optical carrier frequency. An ordinary diffuse reflecting target (one whose surface is rough compared to the optical wavelength) will scatter the incident beam described by Eq. 8 over a wide solid angle. Each node of the retrodirective array lying within that solid angle will receive pilot-signal bearing scattered light originating from the virtual beacon.

Standard trigonometric identities can be used to show that the time-dependent signal amplitude expressed in Eq. 8 can be re-expressed in the form $$e(t) = a\cos\omega_L t + \frac{b}{2}\cos[(\omega_L + \omega_{RF})t + \theta_0] + \frac{b}{2}\cos[(\omega_L - \omega_{RF})t - \theta_0]. \tag{9}$$

Since each frequency component propagates like a plane wave at a sufficient distance from the target, the signal incident on the $k^{th}$ node of the retrodirective array is derived from Eq. 9 by delaying each frequency component by $t - n_L r_k/c$, $$s_k(t) = a\cos\left[\omega_L\left(t - \frac{n_L r_k}{c}\right)\right] + \frac{b}{2}\cos\left[(\omega_L + \omega_{RF})\left(t - \frac{n_L r_k}{c}\right) + \theta_0\right] + \tag{10}$$

$$\frac{b}{2}\cos\left[(\omega_L - \omega_{RF})\left(t - \frac{n_L r_k}{c}\right) - \theta_0\right],$$

where $r_k$ is the distance from the virtual beacon to the $k^{th}$ node of the array, c is the speed of light in vacuum, and $n_L$ is the index of refraction of the propagation medium at the optical carrier frequency $\omega_L$. Since $\omega_L \gg \omega_{RF}$, the index of refraction $n_L$ is assumed to be constant over the range of optical frequencies contained in Eq. 10. Furthermore, the area over which the target is illuminated is assumed to be small in comparison to the RF wavelength so that the spot behaves like a point source and there is no interference due to simultaneously received signals from spatially separated points on the target.

When the optical signal described by Eq. 10 is incident at a node 102 on an optical receiver 104, the output current is proportional to the time-averaged (over many optical cycles) power carried by $s_k(t)$, which is given by $$P_k(t) \propto \overline{s_k^2(t)} = K \left\{ a^2 + \frac{b^2}{2} + 2ab\cos\left[\omega_{RF}\left(t - \frac{n_L r_k}{c}\right) + \theta_0\right] + \frac{b^2}{2}\cos\left[2\omega_{RF}\left(t - \frac{n_L r_k}{c}\right) + 2\theta_0\right] \right\} \quad (11)$$

where K is a constant and the bar denotes time averaging. The detected signal consists of three frequency components: a dc signal, a component at $\omega_{RF}$, and a component at the second harmonic $2\omega_{RF}$. Suitable filtering can be used to eliminate the dc signal and to isolate either $\omega_{RF}$ or $2\omega_{RF}$ for use as the pilot signal. In this way, an RF pilot signal is delivered to each node of the array via an optical carrier signal.

A pre-conjugation circuit 106 processes the detected signal to isolate either $\omega_{RF}$ or $2\omega_{RF}$ for use as the second RF pilot signal. Additional pre-conjugation processing steps may include, but are not limited to, filtering to eliminate noise and unwanted frequency components and amplification, including low-noise amplification. The output of the signal processing stage is the desired second RF pilot signal at frequency $\omega_{RF}$;

$$s_k^{pilot}(t) = C_k \cos\left[\omega_{RF}\left(t - \frac{n_{laser} r_k}{c}\right) + \theta_0 + \alpha\right]. \quad (12)$$

Here $C_k$ is the amplitude of the pilot signal.

In the illustrative embodiment, each node 102 includes separate and independent phase conjugation circuitry. The second RF pilot signal is combined with a phase reference signal 108. Phase reference signal 108 may be derived from the reference oscillator shown in FIG. 3 that provides a signal of frequency $\omega_{RF}$ to the illuminator or from an RF pilot signal recovered at a designated reference node. Phase reference signal 108 is provided to a frequency-doubler 110 whose output is delivered to each phase conjugator. The phase conjugation method utilized in the illustrative embodiment requires a signal whose frequency is twice that of the pilot signal, i.e., $\omega_{REF} = 2\omega_{RF}$, and that arrives with the same phase at each array node. To ensure an identical reference phase at each node, phase-matched transmission lines (i.e., transmission lines having matched propagation delays L/v, where L is the line length and v is the propagation velocity) transport the reference signal from the source to each array node. A mixer 112 combines the frequency-doubled phase reference signal with the second RF pilot signal.

The output of the mixer includes a component proportional to the product of the two input signals. Using standard trigonometric identities, one may show that the product of the pilot and reference signals may be represented in the following form;

$$\cos\left[\omega_{RF}\left(t - \frac{n_L r_k}{c}\right) + \theta_0 + \alpha\right]\cos\left[2\omega_{RF}\left(t - \frac{L}{v}\right) + \Phi_{REF}\right] = \quad (13)$$
$$\frac{1}{2}\cos\left[3\omega_{RF}t + \theta_0 + \alpha + \Phi_{REF} - \frac{\omega_{RF} n_L r_k}{c} - \frac{2\omega_{RF} L}{v}\right] +$$
$$\frac{1}{2}\cos\left[\omega_{RF}\left(t - \frac{n_L r_k}{c}\right) - \frac{2\omega_{RF} L}{v} + \Phi_{REF} - \theta_0 - \alpha\right],$$

where the propagation delay L/v is identical to within a small fraction of the RF period $T = 2\pi/\omega_{RF}$ for all array nodes. The first term on the right-hand side of Eq. 13 oscillates at a frequency three times that of the pilot signal; the corresponding signal should be removed by appropriate filtering. The frequency of the second term on the right-hand side of Eq. 13 is identical to that of the pilot signal; the corresponding signal is the desired conjugate of the RF pilot signal.

A post-conjugation circuit 114 eliminates the undesired signal corresponding to the first term on the right-hand side of Eq. 13 while preserving the phase-conjugate RF pilot signal corresponding to the second term on the right-hand side of Eq. 13. Additional post-conjugation processing steps may include, but are not limited to, filtering to eliminate noise and unwanted frequency components and amplification, including low-noise amplification.

The phase-conjugated RF pilot signal emerging from the post-conjugation circuit is amplified by a power amplifier 116 having gain G. The power amplifier may be a solid-state device utilizing semiconductor transistor technology. Examples include, but are not limited to, silicon bipolar transistors, silicon metal-oxide field-effect transistors (MOSFETs), and gallium arsenide, gallium nitride, and indium phosphide field-effect transistors (FETs). Furthermore, the power amplifier may utilize vacuum electron device (VED) technology. Examples of VED amplifiers include, but are not limited to, klystrons, traveling-wave tubes (TWTs), and gyroklystrons. Finally, the power amplifier may be a hybrid device using, for example, solid-state technology for the initial low-power stages and VEDs for one or more high-power output stages.

Finally, the phase-conjugated RF pilot signal 118 is radiated by the transmitting antenna 120 of the $k^{th}$ array node is:

$$c_k(t) = A_k \cos\left[\omega_{RF}\left(t + \frac{n_L r_k}{c}\right) - \frac{2\omega_{RF} L}{v} + \Phi_{REF} - \theta_0 - \alpha + \gamma\right], \quad (14)$$

where $\gamma$ is a phase shift accounting for the shift in phase accumulated during and after phase conjugation. All phase shifts in the argument of Eq. 14 can be engineered to be nearly identical for all nodes by phase matching the cables that distribute the phase-conjugation reference signal to each node and by phase matching the pre- and post-conjugation signal processing blocks as well as the phase-conjugation circuits themselves. The only phase that cannot be matched among nodes is the conjugated delay $\omega_{RF} n_L r_k/c$ accumulated during propagation from the target to node k.

Figure 6:
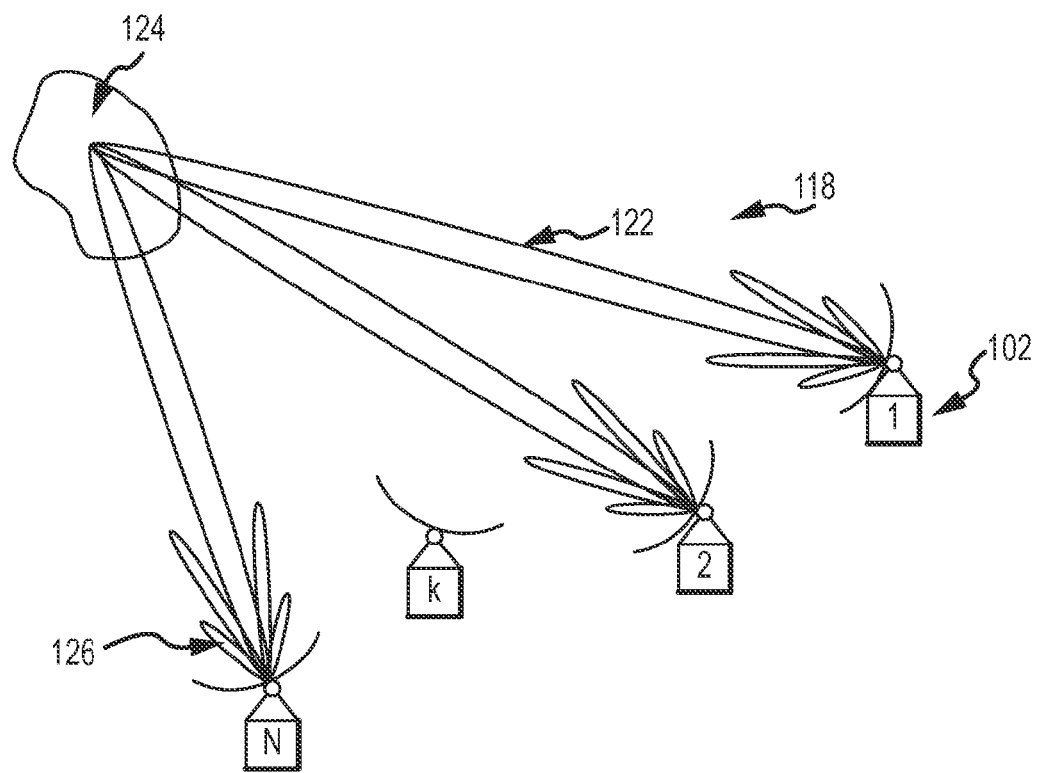
FIG. 6 is a diagram illustrating multiple nodes retransmitting the phase-conjugated RF pilot signals such that their main beams add in-phase at the target.

As shown in FIG. 6, each array node 102 that sees the virtual beacon radiates a phase-conjugated RF pilot signal 118 having the form given by Eq. 14. The node beam pattern has a main beam 122 that overlaps the target 124 and side lobes 126 that do not overlap the target. The resulting signal incident on the target 124 at the virtual beacon is the sum of all such signals transmitted by all array nodes;

$$S_{target}(t) = \sum_{k=1}^{N} B_k \cos\left[\omega_{RF}\left(t + \frac{r_k n_L}{c_0} - \frac{r_k n_{RF}}{c_0}\right) - \frac{2\omega_{RF} L}{v} + \Phi_{REF} - \alpha + \gamma\right] \qquad (15)$$

Here $B_k$ is the amplitude of the signal incident from the $k^{th}$ node of the array. If the indices of refraction are identical at optical and RF frequencies, the argument of the cosine is independent of the index k and is therefore identical for all array elements. While the indices are nearly the same for atmospheric propagation, they are different and this difference places limitations on array size and performance.

Figure 7:
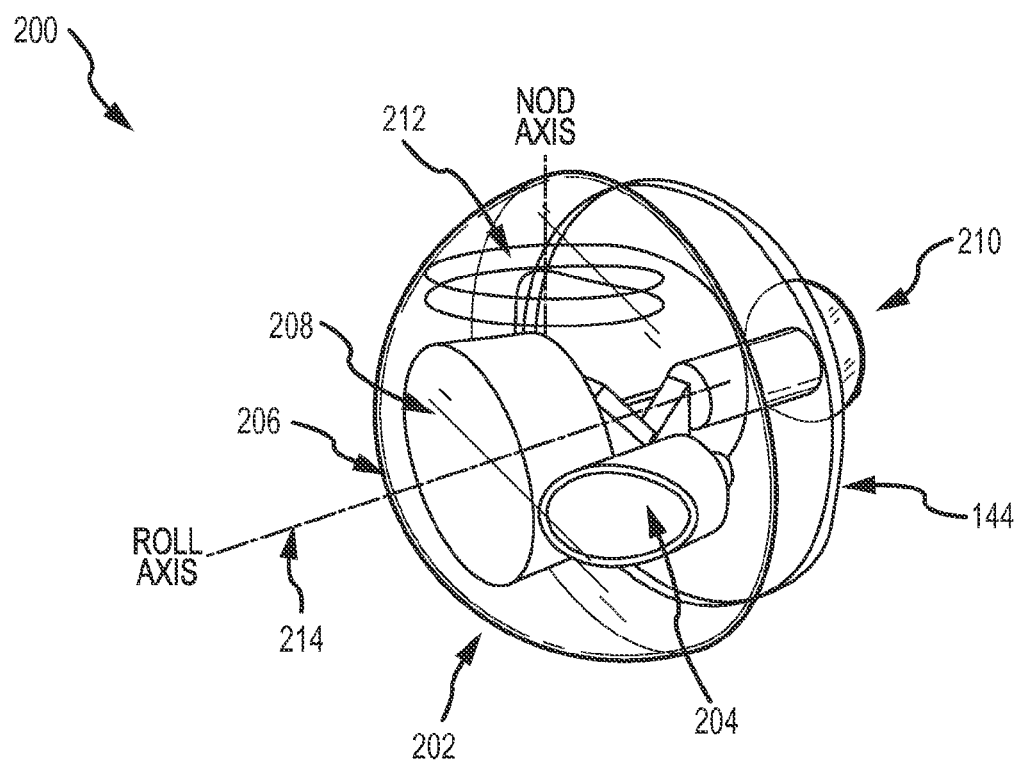
FIG. 7 is a diagram of an embodiment in which the illuminator is mounted on and slaved to the pointing and tracking system.

As illustrated in FIG. 7, an AIM-9X Imaging Seeker 200 has been modified for use in an ARAA with a virtual beacon to point, track and illuminate a target. The seeker's Roll/Nod gimbal 202 includes all of the mechanical components forward of the bulkhead that articulate in the roll and nod axes. The optical components in the standard AIM-9X seeker head and an illuminator 204 for transmitting an optical carrier beam with the RF pilot signal are mounted on the gimbal. Illuminator 204 is aligned with the seeker boresight. In this particular configuration, the Imaging Seeker passively detects the IR signature of a target such as the heat signature of a launched MANPAD. In other configurations, the Imaging Seeker could actively or semi-actively detect a laser spot reflected off of the target.

Infrared energy enters the seeker gimbal 202 over a wide field of view, suitably tens of milliradians, through a dome 206. A folded Afocal Telescope 208 collects IR energy. The energy is collimated into a beam and travels through a series of prisms and relay and focus optics to a Staring Focal Plane Array (FPA) 210. The prisms and optics are configured in such a way that they enable the seeker's gimbal to articulate in both roll and nod. As the energy exits the folded Afocal Telescope it crosses the nod axis 212, enters the prism and is relayed to where it reaches the sealed bulkhead where it crosses the roll axis 214. Beyond this point the optics and FPA detector are body fixed. Once past the gimbal's roll axis the energy enters the relay and focus optics lens set. This set of optics forms the image on the FPA 210 located at the image plane of the focus optics.

The bulkhead and fixed components of the seeker aft of the gimbal allow for high Off Boresight Angle (OBA) operation within the traditional 3 inch Sidewinder dome diameter. The Roll/Nod gimbal configuration provides superior target tracking Off-Gimbal Inertial Seeker Assembly allows high slew rates. With the Roll/Nod gimbal the FPA 210 is off-gimbal. There are no cryogenic lines that must cross the gimbals. The reduced on-gimbal mass and minimal spring torque allow the gimbal to be controlled by a high bandwidth control loop that drives the Roll/Nod torquer motors enabling very high speed slewing and fast settling times for the seeker. High precision resolvers measure the seeker pointing angle. Sensors measure gimbal positions and platform motion along the different axis.

A processor processes the IR image captured by the FPA to detect the target and generate a guidance signal causing the gimbal to roll and nod to point at the target. This in turn points illuminator 204 at the target to direct the optical carrier onto the target to create the virtual beacon.

Figure 8:
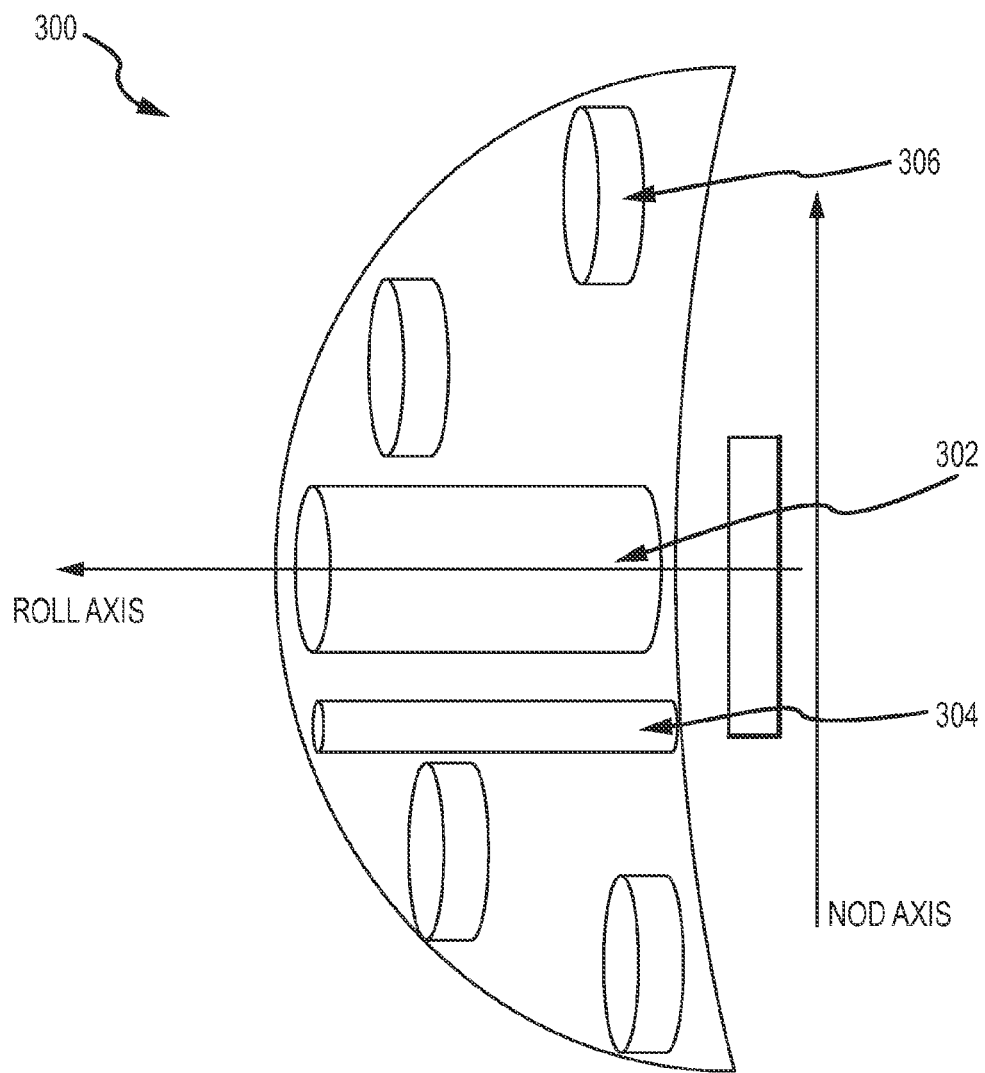
FIG. 8 is a diagram of an embodiment in which the nodes of the array and the illuminator are mounted on and slaved to the pointing and tracking system.

As shown in FIG. 8, a roll/nod gimbal 300 includes all of the mechanical components forward of the bulkhead that articulate in the roll and nod axes. The optical components 302 for the seeker head and an illuminator 304 for transmitting an optical carrier beam with the RF pilot signal are mounted on the gimbal and aligned along seeker boresight. A plurality of ARAA nodes 306 are arrayed on gimbal and nominally aligned along seeker boresight. As the gimbal rolls and nods to point at the target, illuminator 304 directs the optical carrier beam onto the target to create the virtual beacon. The nodes detect the scattered light to extract the RF pilot signal and then phase-conjugate, amplify and retransmit the pilot signal back towards the target. In this configuration the entire ARAA including the point and track device, illuminator and nodes are all mounted on a single gimbal.

The proliferation of shoulder-launched missiles known as MANPADS for "Man-Portable Air-Defense System" and their availability to terrorists present a real threat to military aircraft and particularly commercial aircraft. Estimates of the number of attacks on commercial aircraft vary, running as high as 43 hits on civilian aircraft—with 30 of these resulting in aircraft kills and the loss of nearly 1,000 lives—since the 1970s. More than half a million MANPADS have been delivered worldwide, and many of these are still operational. These missiles currently use infrared (IR) seekers to track and lock-on to the aircraft. The missiles typically have a range of 5-8 km and can reach an altitude of approximately 12,000 ft. Historically, countermeasures range from active IR jamming to flares and chaff.

Figure 9:
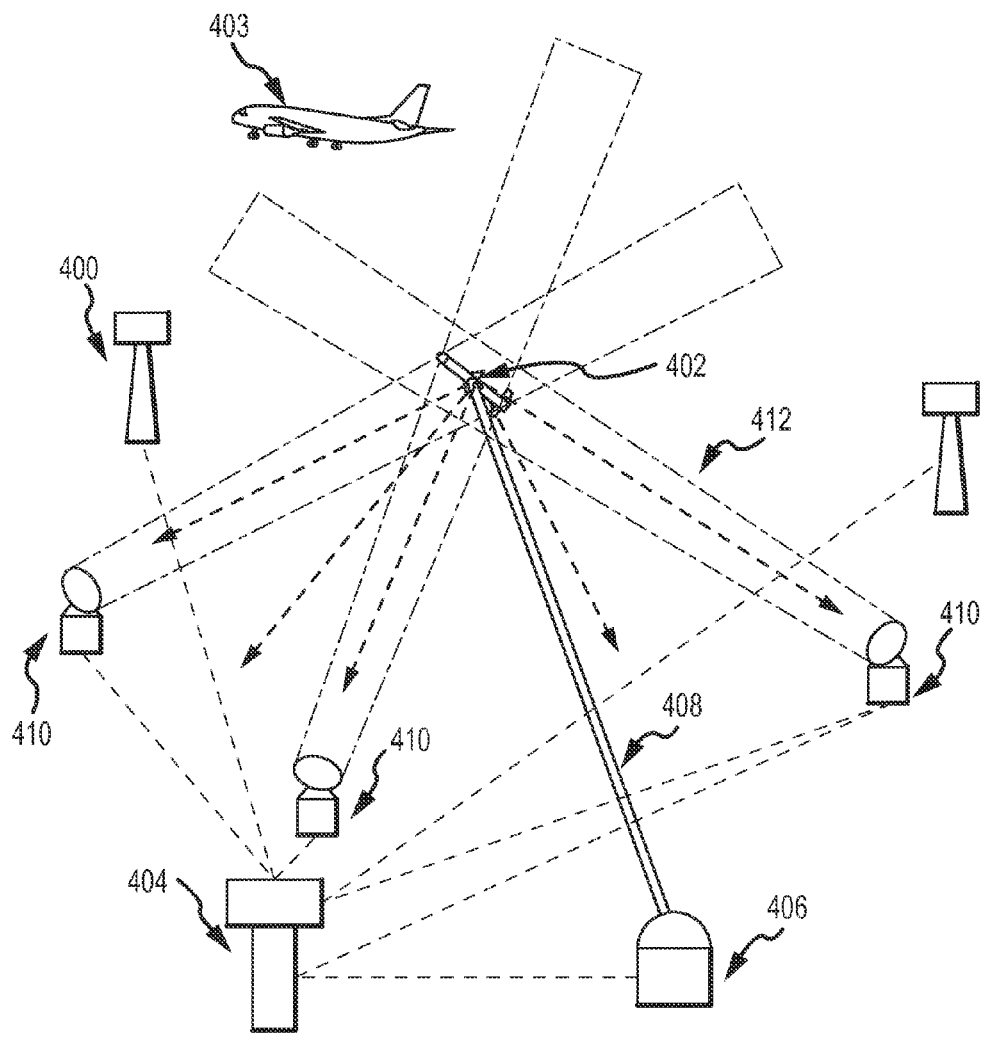
FIG. 9 is a diagram of an embodiment of an active retrodirective antenna array for use as a directed energy weapon in an airport protection system.
Figure 10:
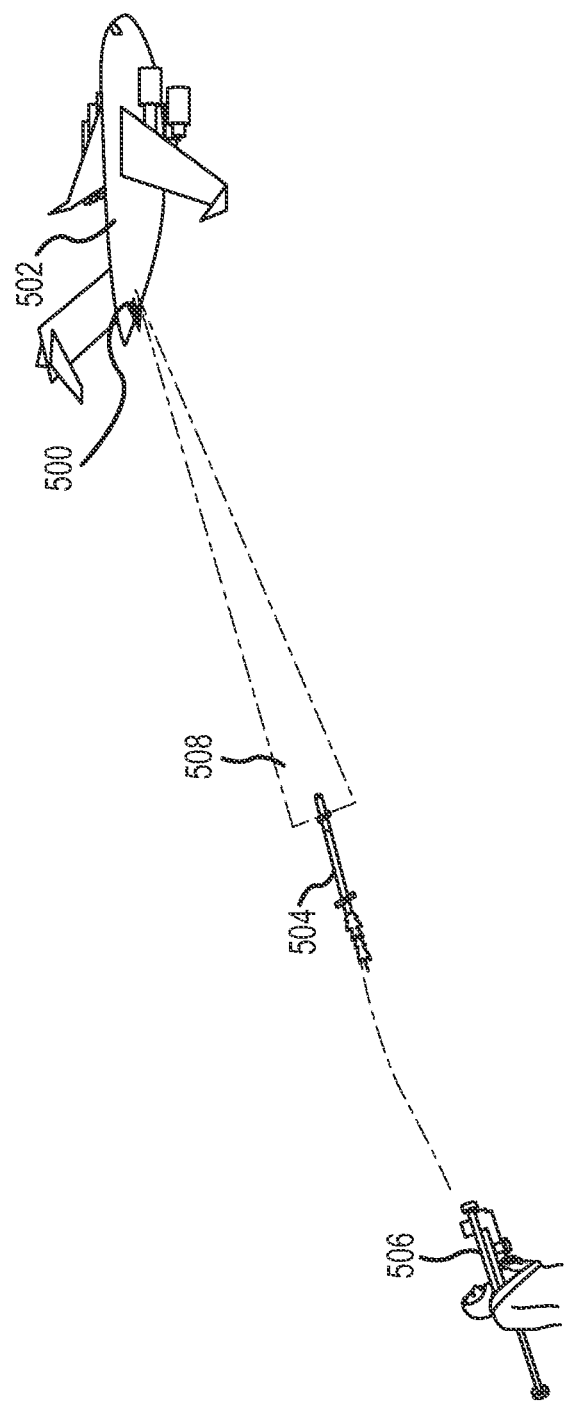
FIG. 10 is a diagram of an active retrodirective antenna array for use as a directed energy weapon in an aircraft protection system.

The virtual beacon ARAA may be configured as a directed energy weapon to provide a defense against MANPADS (and other threats) for an airport as shown in FIG. 9 or an individual commercial aircraft as shown in FIG. 10. The ARAA delivers a total directed energy greater than a target dependent threshold to incapacitate, damage or destroy the target.

As shown in FIG. 9, an airport security system includes multiple sensors 400 to detect a missile 402 launch at a commercial aircraft 403, and relay coordinate information to a control node 404, which incorporates pointing and tracking functions. This information is relayed to an illuminator 406 in the form of a tracking signal. The illuminator is responsive to point tracking signal to point the laser beam 408 (and RF pilot signal) at missile 402. Array nodes 410 detect and process the scattered light to extract the RF pilot signal. The phase conjugation function can be distributed among the array nodes or implemented using central phasing, in which the RF pilot signal received by each node is sent to a master conjugator for phase conjugation. The master conjugator is located within the control node 404. The array nodes 410 retransmit the amplified phase-conjugated RF pilot signal such that the main beam 412 of the transmitted RF energy overlaps the missile. The main beams overlap and add in-phase at the virtual beacon to deliver increased RF onto the missile that exceeds a threshold to incapacitate, damage or destroy the missile. Each sensor may incorporate multiple individual sensor technologies, including (but not limited to) radar (including millimeter-wave radar), infrared sensors, ultraviolet sensors, imaging sensors, etc. The dashed lines denote communication links between the sensors, control node and array nodes.

As illustrated in FIG. 10, an ARAA 500 suitably of the type depicted in FIG. 8 is mounted in a "blister pack" near the rear of an aircraft 502. The point and track, illumination and nodes are arrayed on a single gimbal. The ARAA detects the launch of a missile 504 from a MANPADS 506, tracks the missile and points the boresight of the gimbal at the missile. The illuminator directs a optical carrier beam 508 with the RF pilot signal onto the missile to create the virtual beacon. The nodes detect the scattered light, extract the RF pilot signal, phase-conjugate, amplify and retransmit the phase-conjugated RF pilot signal (not shown) to overlap in-phase at the target. The multiple RF beams add so that the combined power exceeds a target dependent threshold to incapacitate, damage or destroy the missile before the missile can strike the aircraft.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method of directing RF energy from an active retrodirective antenna array onto an uncooperative target, said array comprising a plurality of nodes that each transmit RF energy, comprising:
   directing an optical carrier beam with a first RF pilot signal imposed thereon into a spot on the target, said target scattering the optical carrier beam to illuminate a plurality of the nodes of the retrodirective array to form a virtual beacon; and
   at each of the plurality of illuminated nodes in the retrodirective array,
      optically detecting the scattered optical carrier beam to extract a second RF pilot signal including a phase accumulated during propagation from the target to said node;
      processing the second RF pilot signal and a phase reference signal to produce a phase-conjugated RF pilot signal; and
      amplifying and retransmitting the phase-conjugated RF pilot signal towards the target.

2. The method of claim 1, wherein the optical carrier beam has a wavelength within a range of approximately 0.4 to 300 microns and the wavelength of the first RF pilot signal is within a range of 0.6 mm to 0.6 m.

3. The method of claim 1, further comprising:
   sensing a range to target; and
   adaptively focusing the optical carrier beam based on said range to target to maintain the spot size.

4. The method of claim 1, further comprising:
   tracking the target; and
   slaving the optical carrier beam to the tracking of the target to maintain the optical carrier beam on the target.

5. The method of claim 4, wherein each node retransmits the phase-conjugated RF pilot signal in a beam pattern including a main beam, further comprising:
   slaving the retransmission of the phase-conjugated RF pilot signal at each node to the tracking of the target to maintain the main beam on the target.

6. The method of claim 1, wherein the step of optically detecting the scattered optical carrier beam comprises:
   averaging the power of the optical carrier beam incident on the node over multiple optical cycles of the beam to generate a power signal, said power signal including a component at the same frequency as the first RF pilot signal and at least one component at a harmonic of the frequency of the first RF pilot signal; and
   filtering the power signal to extract one said component as the second RF pilot signal.

7. The method of claim 6, wherein the power signal is filtered to extract the component at the same frequency as the first RF pilot signal as the second RF pilot signal.

8. The method of claim 1, further comprising:
   providing a reference signal having a reference frequency and a reference phase, said reference signal or a first derivative thereof corresponding to the first RF pilot signal imposed on the optical carrier beam; and
   using the reference signal or a second derivative thereof as the phase reference signal.

9. The method of claim 1, wherein the spot has a diameter less than one-half wavelength of the first RF pilot signal.

10. The method of claim 1, wherein each node retransmits the phase-conjugated RF pilot signal in a beam pattern including a main beam, further comprising:
    tracking the target;
    slaving the optical carrier beam to the tracking of the target to maintain the optical carrier beam on the target;
    adaptively focusing the optical carrier beam to maintain the spot size; and
    slaving the retransmission of the phase-conjugated RF pilot signal at each node to the tracking of the target to maintain the main beam on the target so that the main beams add substantially in-phase at the target and deliver a total directed energy greater than a target dependent threshold to incapacitate, damage or destroy the target.

11. A method of directing RF energy from an active retrodirective antenna array onto an uncooperative target, said array comprising a plurality of nodes that each transmit RF energy within beam pattern having a main beam comprising:
    tracking the target to provide a range-to-target and angle-to-target;
    directing an optical carrier beam with a first RF pilot signal imposed thereon into a spot on the target, said beam direction responsive to said angle-to-target to maintain the spot on the target, said beam adaptively focused based on the range-to-target to maintain the spot size on the target, said target scattering the optical carrier beam to illuminate a plurality of the nodes of the retrodirective array to form a virtual beacon; and
    at each of the plurality of illuminated nodes in the retrodirective array,
       optically detecting the scattered optical carrier beam to extract a second RF pilot signal including a phase accumulated during propagation from the target to said node;
       processing the second RF pilot signal and a phase reference signal to produce a phase-conjugated RF pilot signal;
       amplifying the phase-conjugated RF pilot signal towards the target; and
       retransmitting the phase-conjugated RF pilot signal in a directed response to said angle-to-target to maintain the main beam on the target so that the main beams add substantially in-phase at the target and deliver a total directed energy greater than a target dependent threshold to incapacitate, damage or destroy the target.

12. The method of claim 11, wherein the step of optically detecting the scattered optical carrier beam comprises:
    averaging the power of the optical carrier beam incident on the node over multiple optical cycles of the beam to generate a power signal, said power signal including a component at the same frequency as the first RF pilot signal and at least one component at a harmonic of the frequency of the first RF pilot signal; and
    filtering the power signal to extract the component at the same frequency as the second RF pilot signal.

13. A device for directing RF energy onto an uncooperative target, comprising:
    an active retrodirective antenna array comprising a plurality of nodes;
    an illuminator that directs an optical carrier beam with a first RF pilot signal imposed thereon into a spot on the target, said target scattering the optical carrier beam illuminating a plurality of nodes of the retrodirective array to form a virtual beacon; and each node of the retrodirective array comprising,
- an optical receiver for detecting the scattered optical carrier beam to extract a second RF pilot signal;
- a circuit for processing the second RF pilot signal and a phase reference signal to produce a phase-conjugated RF pilot signal;
- gain for amplifying the phase conjugated RF pilot signal; and
- an antenna for retransmitting the phase-conjugated and amplified RF pilot signal towards the target.

14. The device of claim 13, further comprising:
a point and track device that tracks the target,
said illuminator slaved to the tracking of the target to maintain the optical carrier beam on the target.

15. The device of claim 14, wherein said point and track device slews to point a boresight axis at the target, said illuminator mounted on the point and track device to direct the optical carrier beam substantially along the boresight axis.

16. The device of claim 15, wherein said nodes are arrayed on the point and track device to transmit nominally along the boresight axis.

17. The device of claim 14, wherein said point and track device generates a tracking signal and each node retransmits the phase-conjugated RF pilot signal in a beam pattern including a main beam, each said node being independently responsive to the tracking signal to track the target and retransmit the phase-conjugated RF pilot signal to maintain its main beam on the target.

18. The device of claim 13, wherein the optical receiver detects the scattered optical carrier by averaging the power of the optical carrier beam incident on the node over multiple optical cycles of the beam to generate a power signal, said power signal including a component at the same frequency as the first RF pilot signal and at least one component at a harmonic of the frequency of the first RF pilot signal and filtering the power signal to extract one said component as the second RF pilot signal.

19. The device of claim 18, wherein the optical receiver filters the power signal to extract the component at the same frequency as the first RF pilot signal as the second RF pilot signal.

20. The device of claim 13, further comprising:
- a source of a reference signal having a reference frequency and a reference phase, said reference signal or a first derivative thereof corresponding to the first RF pilot signal imposed on the optical carrier beam,
- said circuit using the reference signal or a second derivative thereof as the phase reference signal to produce the phase-conjugated RF pilot signal.

* * * * *